(12) United States Patent
Mayr et al.

(10) Patent No.: US 6,612,011 B2  
(45) Date of Patent: Sep. 2, 2003

(54) FLEXIBLE WORK STATION

(75) Inventors: Georg Mayr, Obergriesbach (DE); Martin Stedele, Augsburg (DE)

(73) Assignee: KUKA Schweissanlagen GmbH (DE)

( * ) Notice: Subject to any disclaimer, the term of this patent is extended or adjusted under 35 U.S.C. 154(b) by 15 days.

(21) Appl. No.: 09/772,297

(22) Filed: Jan. 29, 2001

(65) Prior Publication Data

US 2001/0003861 A1 Jun. 21, 2001

Related U.S. Application Data

(63) Continuation-in-part of application No. PCT/EP99/04688, filed on Jul. 6, 1999.

(30) Foreign Application Priority Data

Jul. 31, 1998 (DE) .......................... 298 13 669

(51) Int. Cl.[7] .............................................. B21D 39/03
(52) U.S. Cl. .............................. 29/430; 29/771; 29/785
(58) Field of Search .......................... 29/771, 430, 785, 29/787, 784

(56) References Cited

U.S. PATENT DOCUMENTS

| | | | | |
|---|---|---|---|---|
| 4,275,986 A | * | 6/1981 | Engelberger et al. | |
| 4,611,749 A | * | 9/1986 | Kawano | |
| 4,711,016 A | * | 12/1987 | Genschow et al. | |
| 4,740,133 A | * | 4/1988 | Kawano | |
| 4,764,078 A | | 8/1988 | Neri | |
| 4,833,770 A | * | 5/1989 | Esser et al. | |
| 4,890,969 A | * | 1/1990 | Esser | |
| 5,188,276 A | * | 2/1993 | Furuya et al. | 29/430 |
| 5,848,747 A | * | 12/1998 | Nishi | |
| 6,256,868 B1 | * | 7/2001 | Sugito et al. | 29/784 |

FOREIGN PATENT DOCUMENTS

| | | |
|---|---|---|
| DE | 37 36 002 A1 | 11/1988 |
| DE | 37 39 405 A1 | 6/1989 |
| EP | 0 002 782 A2 | 7/1979 |
| EP | 0 579 160 A1 | 1/1994 |
| EP | 0 582 117 A1 | 2/1994 |

* cited by examiner

Primary Examiner—Douglas Olms  
Assistant Examiner—Steve Blount  
(74) Attorney, Agent, or Firm—McGlew & Tuttle, P.C.

(57) ABSTRACT

A flexible work station (1) and an operating method for processing, especially the joining and geometric welding of two or more different types of components (4, 5). The work station (1) has a component feed device (6, 7), one or more flexible processing places (2) with a plurality of movable and type-related positioning devices (14, 15) with a clamping device (16), as well as one or more processing devices (13) and at least one transport device (9). The transport device (9), which is preferably designed as a robot, has a plurality of replaceable and type-related gripping tools (10, 11), with which it transports the components (4, 5) from the component feed device (6, 7) to the positioning devices (14, 15). In the case of a change from one component to another, the gripping tool (10, 11) is changed as well, and the old gripping tool (10, 11) is laid down on a gripper rest (22) at or on the components (4, 5), which are just located on the positioning device (14, 15) or on the component feed means (6, 7). The component loaded last is no longer processed and is brought with the laid-down gripping tool into a resting position.

20 Claims, 1 Drawing Sheet

FLEXIBLE WORK STATION

CROSS-REFERENCES TO RELATED APPLICATIONS

The present application is a Continuation-In-Part of PCT International application #PCT/EP99/04688 filed Jul. 6, 1999 designating the United States of America.

FIELD OF THE INVENTION

The present invention pertains to a flexible work station and an operating method for processing components, especially the joining and geometric welding of two or more different types of components.

BACKGROUND OF THE INVENTION

Flexible work stations for vehicle shells in transfer stations have been known from practice, in which different types of components for different vehicle models are fed in a free mix by means of a component feed means. In the case of a change from one component to another, the clamping device, which comprises changing frames on both sides of the transfer line, is replaced. Such work stations are designed as so-called framing stations, in which the shell is built up and welded gradually from the floor group, the front and side parts as well as the roof.

Work stations, which are related to the type, are likewise provided for manufacturing these body parts. Workpiece subgroups are joined together into main groups and welded here. These types of work stations are intended for one type of component only. If the production of a vehicle model is to be replaced with the production of another model, it is necessary to convert the existing work station or to build up a second work station. This leads to a loss of production during the conversion time and to reduced output during the start-up phase in the first case. The building up of a second unit is expensive and requires construction. Besides the model-related components of the unit, it is also necessary to newly acquire all the components of the unit that are neutral or common with respect to the components or models. Moreover, a sufficient free space must also be available for the second unit. The second unit requires a complete putting into operation and a connection of the new unit to the existing material flow. If a combined production of two different models is to take place within the prior-art work station, a retooling operation is necessary. This leads to a loss of production during the retooling operation and permits only a limited workpiece spectrum. If the needed amount of units produced decreases for one vehicle model, this leads to an increase in the cycle time or to a reduction in the work time in the prior-art work station, and both lead to a reduction in the degree of utilization of the unit and consequently in the profitability of the investment.

SUMMARY AND OBJECTS OF THE INVENTION

The primary object of the present invention is therefore to propose a workstation which is more efficient and more versatile than the prior art workstations.

This object is accomplished by feeding a plurality of first components to a loading area of the workstation. A plurality of second components are also feed to the loading area of the workstation. One of the plurality of first components are gripped with a first gripping tool, and one of the plurality of second components are griped with a second gripping tool while the one of the first components is still gripped by the first gripping tool. A transport device is selectively coupled to one of the first and second gripping tools gripping the respective one of the first and second components. The transport device selectively transports the one of the first and second components from the loading area to a processing area. The transport device then disconnects the one of the first and second gripping tools from the one component at the processing area. The transport device then transports the one of the first and second gripping tools from the processing area to the loading area after the one gripping tool has been disconnected from the one component.

The work station according to the present invention offers great flexibility and makes it possible to process two or more types of components in a free mix.

The work station according to the present invention can be shipped at first as an individual station for a vehicle model and a type-related component, with the flexibility components already being present.

If the production of one vehicle model is to be replaced with the production of another model, the work station according to the present invention has the following advantages: The model-specific components of the unit for components of new vehicle models can be prepared in parallel to the running production. The corresponding tryout phases are possible during production-free times. A pilot production can take place alternately with the running production. A run-up phase is dispensable, so that there is no more reduction in the output of the unit. After the end of the originally produced model, the corresponding model-specific components of the unit can be rapidly removed from the unit during production-free times.

Another advantage is that the elements of the unit that are neutral or common with respect to the components can continue to be used. Large free spaces for a complete second unit are no longer necessary. Likewise, complete putting into operation is no longer necessary. A repeated connection of a second unit to an existing material flow can be eliminated as well.

Moreover, the work station according to the present invention makes possible the processing of components of two vehicle models in a free mix. This is especially advantageous in the case of models to be produced in a small number, because two or more models can be produced in one unit. Should the number of units of a model to be produced decrease, an additional model can be produced on the same unit. No conversion is necessary for changing over the production between these two models. Loss of production is avoided.

The two models to be produced can be rapidly replaced with other, already integrated models. In addition, a broad workpiece spectrum is possible. It is particularly advantageous in a mixed operation that the gripper rests are provided for the type-related gripper tools on the components which are on the positioning means and/or the component feed means. The ancillary times for a gripper change are considerably reduced as a result.

In the case of a change from one model to another, the gripper tool is laid down on the component of the old type to be processed as the next component (in the work station or in the component feed means). In the case of a repeated change of models, this component will be processed as the first component. The model change can take place more rapidly as a result.

The work station according to the present invention makes it possible to adapt the operations to different cycle times, and short cycle times are also possible.

It is also advantageous that the station design is applicable independently from the specifications of customers and plant operators. The modular character of the work stations is advantageous for the planning of new units. The modular design of the station elements from components proven in practice is advantageous for the reliability of the operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
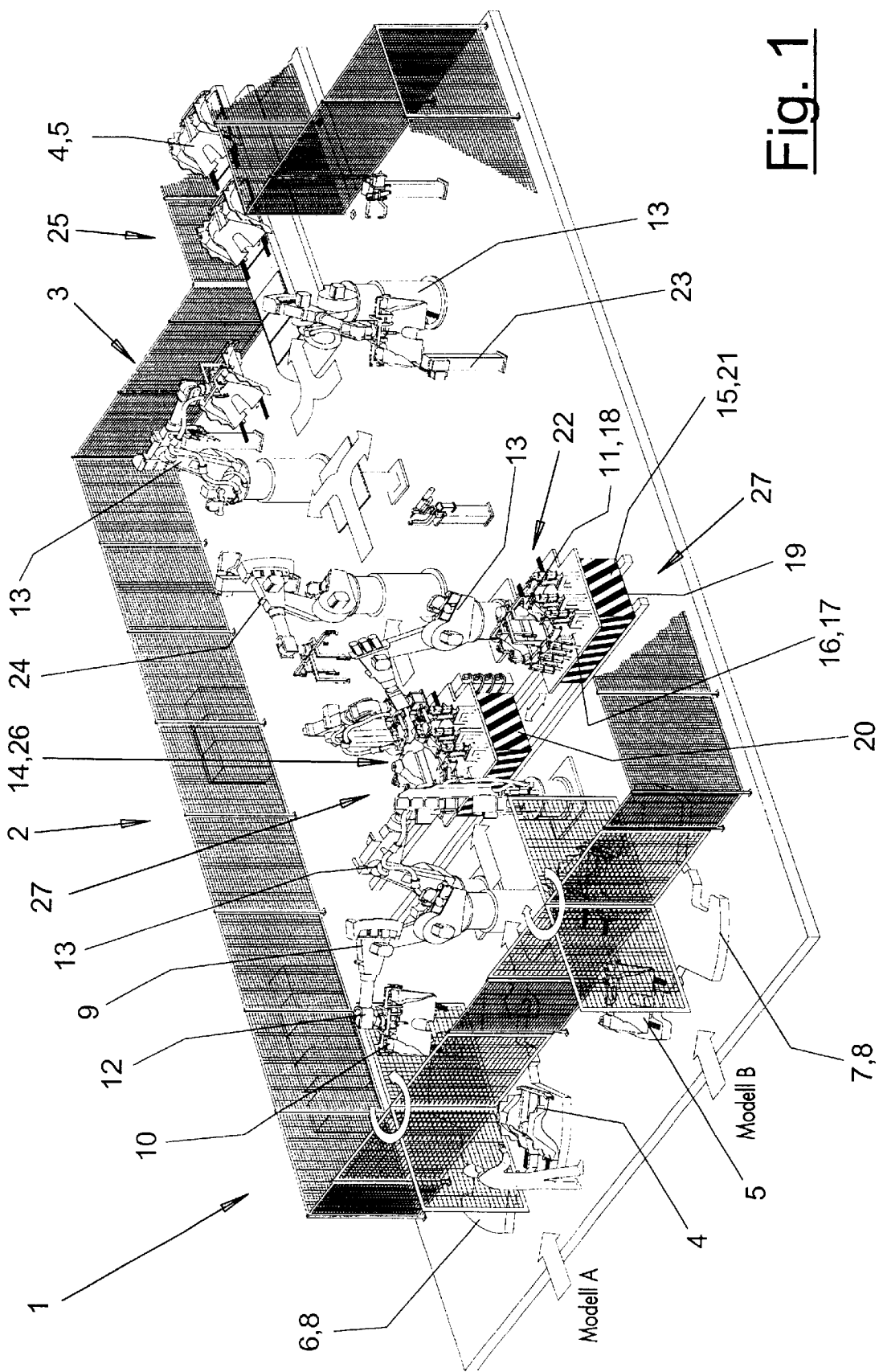
FIG. 1 is a perspective view of a flexible work station.

The work station 1 is designed as a cell and is intended for processing two or more different types of components 4, 5. The components are preferably parts of a vehicle body. The different types of components 4, 5 belong to two different vehicle models A and B. Joining and geometric welding of component subgroups, which consist of individual parts and/or prejoined components, into so-called main groups are preferably carried out in the work station 1. Engine compartments consisting of various plates are joined and welded in the exemplary embodiment being shown.

The work station 1 has at least one flexible processing place 2, at which the different components 4, 5 can be processed in a free or selectable mix. The components 4, 5 are fed in by means of two separate component feed means 6, 7, which are preferably arranged next to one another or alternatively one on top of another, and are brought to the processing place 2 with a transport device 9, which is preferably designed as a multiaxial transport robot. Another transport means 24, which is again preferably designed as a transport robot, optionally transports the processed components 4, 5 to another processing place 3. This may be followed by additional processing places or a component release 25 for removing the components 4, 5.

The component feed means 6, 7 may have any desired, suitable design. They are always designed for one type of component 4, 5 and have at least one corresponding, type-related feed platform 8, on which the components 4, 5 can be deposited by a worker or a transfer device outside the work station 1 and then brought into the work station 1. In the embodiment being shown, the feed platform 8 is designed as a rotary table with four storage places and protective separating grids between them.

The flexible processing place 2 is used for the alternating processing of the different components 4, 5. It has a number of movable positioning devices 14, 15 corresponding to the number of types. There are two positioning devices 14, 15 in the embodiment being shown. These have a moving unit 20, 21 each, which are designed, e.g., as floor-bound transport carts. The moving units 20, 21 are coupled with one another mechanically or in terms of control engineering and can move together.

The positioning devices 14, 15 are type-related and are always designed for one of the components 4, 5. They each carry a fitting component support 19 and a corresponding clamping means 16 for the component 4, 5. At least the lower tool 17 of the clamping means 16 is arranged on the positioning device 14, 15. The upper tool 18 is arranged on a gripping tool 10, 11, which will be discussed later.

The positioning devices 14, 15 can always move to and fro between a working position 26 on the processing place 2 and a resting position 27. In the embodiment being shown, the moving units 20, 21 can move on rails at right angles to the direction of material flow to the left and right, so that a common working position 26 in the middle and two outside resting positions 27 are obtained. In the exemplary embodiment being shown, the positioning device 14 with its component 4 is in the working position 26. The other positioning device 15 with a component 5 is located in the resting position 27. It forms a storage place for the component 5. This will be discussed later.

The transport robot 9 is arranged between the component feed means 6, 7 and the processing place 2. On the robot hand, it has a change coupling, to which at least two different gripping tools 10, 11, which are related to the particular type of component, can be connected. The gripping tools 10, 11 are also replaced on the transport robot when there is a change in processing from one component or model to another. The gripping tools 10, 11 are preferably designed as so-called geometric grippers, which also form the above-mentioned upper tool 18 for the clamping means 16 at the same time. The still loose individual parts of the components 4, 5 supplied as a subgroup can be grasped and held in the correct position with the geometric gripper. The transport robot 9 picks up the components 4, 5 from the feed platform 8 or the rotary table and places it into the component support 19 of the correspondingly supplied, type-related positioning device 14, 15.

Gripper rests 22 are provided at or on the components 4, 5 for the gripping tools 10, 11 for a tool change. These may be special rest points or other suitable supports directly on the components 4, 5. In the preferred embodiment, the gripper rests 22 are part of the clamping means 16. As an alternative, the gripping rests 22 may also be arranged at the component feed means 6, 7 or the positioning device 14, 15 in case of a suitable design and in association with the components 4, 5.

The upper tool 18 arranged at the gripping tool 10, 11 is complemented with the lower tool 17 to form the clamping means 16 for the components 4, 5. The lower tool 17 can form the gripper rest 22. The gripping tools 10, 11 have suitable positioning and connection elements for coupling the upper tool 18 with the lower tool 17 or the component support 19 in the correct position. The gripping tools 10, 11 may also be permanently connected with these connection elements to the lower tool 17 or the component support 19 in order to form a closed and solid clamping means 16. The component 4, 5 is now fixed and clamped in the clamping means 16 in the correct position. As a result, it is also permanently connected to the positioning device 14, 15.

A plurality of processing devices 13, which are preferably designed as robots, are present at the processing place 2. In particular, it may be welding robots, which weld the individual components of the components 4, 5 in intended areas. The gripping tool 10, 11 remains at the component 4, 5 during this processing operation. At the end of the work, the transport robot 9 separates its gripping tool 10, 11 from the component 4, 5 and moves to the component feed means 6, 7 for taking over a new component 4, 5 of the same type. At the same time, the second transport robot 24 takes over the processed component 4, 5 and brings it to a rest at the second, adjacent processing place 3. The component 4, 5 is taken over by one or more additional processing devices 13, especially robots, and subjected to further processing. It is possible, e.g., to weld additional weld points at stationary processing devices 23, especially spot-welding tongs or the like. The robots 13 then hand over the finished component 4, 5 to the component release 25, which is designed, e.g., as a conveyor belt.

Components 4 that belong to model A are processed in the exemplary embodiment being shown. A component 5 for model B is located with its positioning device 15 on a storage place in the resting position.

If there is now to be a change from one component to another, the transport robot 9 brings yet another component 4 for model A to the processing place 2, where it is fixed and clamped in the clamping means 16 as was described above. The transport robot 9 opens the change coupling 12 and separates from the gripping tool 10, which remains on the positioning device 14 by means of the gripper rest 22 on the component 4. The position and the connection of the gripping tool 10 with the positioning device 14 is secured by the above-mentioned connection elements.

The component 4 just loaded is no longer processed, but is brought to a storage place or its resting position 27. The two moving units 20, 21 move to the left from the position shown in FIG. 1 for this purpose, and the positioning device 15 with the component 5 of model B loaded last reaches the working position 26. This yet unprocessed component 5 is now processed by the processing devices 13.

At the same time, the transport robot 9 is coupled with the gripping tool 11 which is still at the component 5 and its gripper rest 22 and separates the gripping tool 11 from the component 5 after completion of the processing. The transport robot 9 moves to the component feed means 7 in order to pick up the next supplied component 5. At the same time, the second transport robot 24 takes over the component 5 just processed and brings it to the downstream processing place 3 or to the component release 25. This immediately processed and stored component 5 now forms the first component of a new production cycle for model B.

In another embodiment, the last component 4 of the model A to be discontinued completes all of its processing in the working position 26, and the positioning device 14 with its completed component 4 is moved to the resting position 27. When the model A is to be continued again, the completed component 4 is moved with the positioning device 14 to the working position 26, and the completed component 4 is removed from the positioning device. A likewise process is also performed for component 5 when model B is to be discontinued.

In this way, the last component 4 of model A can still be processed by the processing means 13 and brought into the resting position 27 to be stored subsequently. The consequence of this will be, on the other hand, that the last component 5 was still processed before storage in the case of model A. An already processed component 5 is now again available at the time of the cycle change and at the repeated beginning of the cycle of model A and can be passed on immediately to the second processing place 3.

In the case of a model change, the gripping tool 10, 11 remains at the component 4, 5 loaded last and the gripping rest 22. The transport robot 9 does not now have to bring the gripping tool 10, 11 to another external storage place and saves ancillary time as a result.

In the case of another change from model B to model A, the above-described operation takes place in the reverse order. Another component B is brought to the processing place 2 after the last component 5 of model B to be processed. It moves there into the right-hand resting position 27 and the storage place with its positioning means 15 and with the gripping tool 11 laid down. The component 4 of model A loaded last reaches the working position 26 as a result, it is processed there and forms the first component for a new production cycle of model A.

In a variant, the gripper rest 22 may be provided at or on a component 4, 5 that is still at the component feed means 6, 7 or the feed platform 8. In the exemplary embodiment being shown, the transport robot 9 with its gripping tool 10 detaches itself in this case from the component 4 of model A processed last at the end of the processing at the processing place 2, and it then lays down the gripping tool 10 on the next component 4 of model A supplied at the component feed means 6.

The transport robot 9 moves to the other component feed means 7 and the first component 5 of model B that is supplied there. The corresponding gripping tool 11 is on its gripping rest 22 on this component 5 and is coupled by the transport robot 9 and is brought to the processing place 2. During these operations of the transport robot 9, the component 4 of model A processed last is removed by the second transport robot 24 from the processing place. The positioning devices 14, 15 then change place. The positioning devices 14, 15 do not form a storage place for the component 4, 5 loaded last and the corresponding gripping tool 10, 11 in this case, but they move empty into the resting position 27.

Various modifications of the embodiment described are possible. Thus, the design embodiment and the arrangement of the processing places 2, the component feed means 6, 7, the gripper rests 22 and the positioning devices 14, 15 may be varied as desired. A common component feed means 6 may be present for the components 4, 5. Corresponding to the desired number of models, more than two of these type-related station components may be present as well. The second processing place 3 may also be flexible and have a design similar to that of the upstream processing place 2. In the embodiment shown, the two robots 13 located next to the line of material flow on the left and right are not type-related and both process components 4, 5 for the models A and B simultaneously. This increases the available cycle time and reduces the transport time component arising for this. As an alternative, both robots 13 may also be type-related, in which case the left-hand robot 13 processes the components 4 for model A and the right-hand robot 13 the other components 5 for model B. The stationary processing devices 23 are correspondingly also present as multiple devices. In a modification of the embodiment shown, the additional processing place 3 may also be eliminated. It is also possible to arrange a plurality of processing places downstream and to optionally make branches in the material flow or the component flow.

While specific embodiments of the invention have been shown and described in detail to illustrate the application of the principles of the invention, it will be understood that the invention may be embodied otherwise without departing from such principles.

List of Reference Numbers

1 Work station, cell
2 Processing place, flexible
3 Processing place
4 Component, model A
5 Component, model B 6 Component feed means
7 Component feed means
8 Feed platform, rotary table
9 Transport device, transport robot
10 Gripping tool, clamping gripper
11 Gripping tool, clamping gripper
12 Change coupling
13 Processing device, welding robot
14 Positioning device
15 Positioning device
16 Clamping means
17 Lower tool
18 Upper tool
19 Component support
20 Moving unit, cart
21 Moving unit, cart
22 Gripper rest, storage place
23 Processing device, stationary
24 Transport device, transport robot
25 Component release
26 Working position
27 Resting position

What is claimed is:

1. A flexible work station for processing first and second different types of components, the station comprising:
   a component feed device;
   a plurality of movable positioning devices with clamping means for clamping the components, said positioning devices being positioning devices of different types including a first type positioning device having first component type specific mounts and a second component type positioning device having second component type specific mounts, said positioning devices of different type being interchangeable in position;
   a transport device which transports the components from said component feed device to said positioning devices, wherein said transport device has a plurality of replaceable type-related gripping tools including a first set of tools for gripping a first type component and a second set of tools for gripping a second type component, said transport device being arranged between said component feed device and said positioning devices;
   a gripper rest attached either to said positioning devices or the components for supporting said gripping tools of the associated component type.

2. A work station in accordance with claim 1, wherein;
   said gripping tools are geometric grippers and form part of said clamping means at said positioning devices.

3. A work station in accordance with claim 1, wherein:
   said gripping tools include an upper tool of said clamping means and can be connected to a lower tool on said positioning devices.

4. A work station in accordance with claim 1, further comprising:
   a plurality of said type-related component feed devices.

5. A work station in accordance with claim 1, wherein:
   said component feed device is a rotary table.

6. A work station in accordance with claim 1, wherein:
   said transport device is a multiaxial industrial robot and is equipped with a change coupling for said gripping tools.

7. A work station in accordance with claim 1, wherein:
   said positioning devices are movable between a common processing area and at least one resting position.

8. A work station in accordance with claim 7, wherein:
   said resting position is a storage place for the components and a corresponding said gripping tool.

9. A work station in accordance with claim 1, wherein:
   said positioning devices include a component support and moving unit.

10. A flexible work station for processing a first type component and a second type component the station comprising:
    a component feed device for feeding components of the first type and a component feed device for feeding components of the second type;
    a plurality of movable positioning devices, said positioning devices being positioning devices of different types including a first type positioning device having first component type specific fitting supports with clamps and a second component type positioning device having second component type specific fitting supports with clamps, said positioning devices of different type being interchangeably positionable at a working site;
    a transport device which transports the components from said component feed device to at least one of said positioning devices, wherein said transport device has a plurality of replaceable type-related gripping tools including a first component type set of tools for gripping a first component type and a second component type set of tools for gripping a second component type, said transport device being arranged between said component feed device and said work site;
    a gripper rest formed on each of said positioning devices on either the components or adjacent to the components or at said component type specific fitting supports for supporting said gripping tools of the associated component type at said positioning devices.

11. A work station in accordance with claim 10, wherein:
    said gripping tools are geometric grippers and form part of said clamps at said positioning devices.

12. A work station in accordance with claim 10, wherein:
    said gripping tools include an upper tool of said clamps and can be connected to a lower tool on said positioning device.

13. A work station in accordance with claim 10, wherein:
    at least one of said component feed devices is a rotary table.

14. A work station in accordance with claim 10, wherein:
    said transport device is a multiaxial industrial robot and is equipped with a change coupling for said gripping tools.

15. A work station in accordance with claim 10, wherein:
    said positioning devices are movable between said work site and individual resting positions.

16. A work station in accordance with claim 15, wherein:
    said resting position is a storage place for the components and a corresponding said gripping tool.

17. A work station in accordance with claim 10, wherein:
    said positioning devices include a component support and moving unit.

18. A flexible work station for processing a first type component and a second type component, the station comprising:
    component feed means for feeding components of the first type and for feeding components of the second type;
    a plurality of movable positioning devices, said positioning devices being positioning devices of different types including a first type positioning device having first component type specific fitting supports with clamps and a second component type positioning device having second component type specific fitting supports with clamps, said positioning devices of different type being interchangeably positionable at a working site;

a transport device with a multiaxial industrial robot equipped with a change coupling for gripping toots which transports the components from said component feed device to one of said positioning devices, wherein said transport device gripping tools are replaceable and component type specific including a first component type set of tools for gripping a first component type and a second component type set of tools for gripping a second component type, said transport device being arranged between said component feed device and said work site;

a gripper rest formed on each of said positioning devices on either the components or adjacent to the components or at said component type specific fitting supports for supporting said gripping tools of the associated component type at said positioning devices.

19. A work station in accordance with claim 18, wherein;

said gripping tools are geometric grippers and form part of said clamps at said positioning devices.

20. A work station in accordance with claim 18, wherein:

said gripping tools include an upper tool of said clamps and can be connected to a lower tool on said positioning devices;

said component feed means includes a rotary table; and said positioning devices are movable between said work site and individual resting positions.

* * * * *